United States Patent
Angelhag

(10) Patent No.: US 8,396,457 B2
(45) Date of Patent: Mar. 12, 2013

(54) PORTABLE COMMUNICATION APPARATUS AND METHOD OF CONTROLLING THE SAME

(75) Inventor: Bo Anders Angelhag, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 352 days.

(21) Appl. No.: 12/637,281

(22) Filed: Dec. 14, 2009

(65) Prior Publication Data

US 2011/0143727 A1 Jun. 16, 2011

(51) Int. Cl.
*H04M 3/42* (2006.01)
(52) U.S. Cl. .............. 455/414.1; 455/434; 455/435; 455/435.1; 455/435.2; 455/515; 370/328
(58) Field of Classification Search .......... 455/434, 455/435, 435.1, 435.2, 435.3, 515; 370/328
See application file for complete search history.

(56) References Cited

U.S. PATENT DOCUMENTS 8,013,692 B2 * 9/2011 Haruta ............. 333/193
2010/0029326 A1 * 2/2010 Bergstrom et al. ..... 455/556.1

FOREIGN PATENT DOCUMENTS

| WO | 00/19344 A2 | 4/2000 |
| WO | 01/33429 A2 | 5/2001 |
| WO | 02/062092 A1 | 8/2002 |

OTHER PUBLICATIONS

International Search Report, corresponding to PCT/EP2010/067099, mailed Feb. 1, 2011.
Written Opinion of the International Searching Authority, corresponding to PCT/EP2010/067099, mailed Feb. 1, 2011.

* cited by examiner

*Primary Examiner* — Kamran Afshar
*Assistant Examiner* — Sayed T Zewari
(74) *Attorney, Agent, or Firm* — Renner, Otto, Boisselle & Sklar, LLP

(57) ABSTRACT

A portable communication apparatus and a method of controlling the portable communication apparatus are disclosed. The method comprises, in response to a triggering event, detecting electronic devices within a detection range of the portable communication apparatus and, for each detected electronic device, performing a look-up operation in a database of electronic devices and users thereof for determining a user of the electronic device. A corresponding computer program product and a corresponding computer-readable medium are also disclosed.

18 Claims, 4 Drawing Sheets

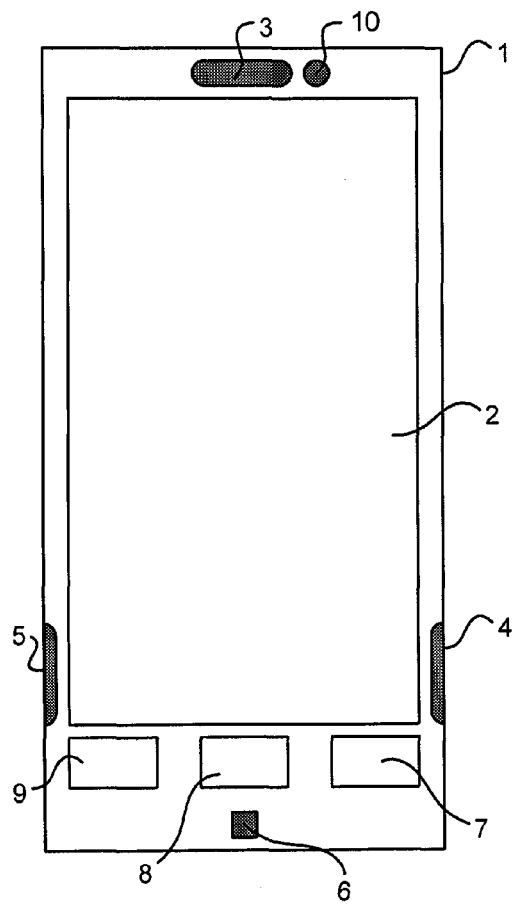
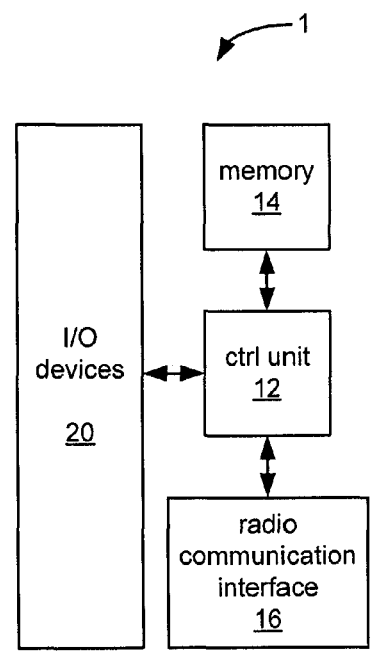
Fig. 1
Fig. 2
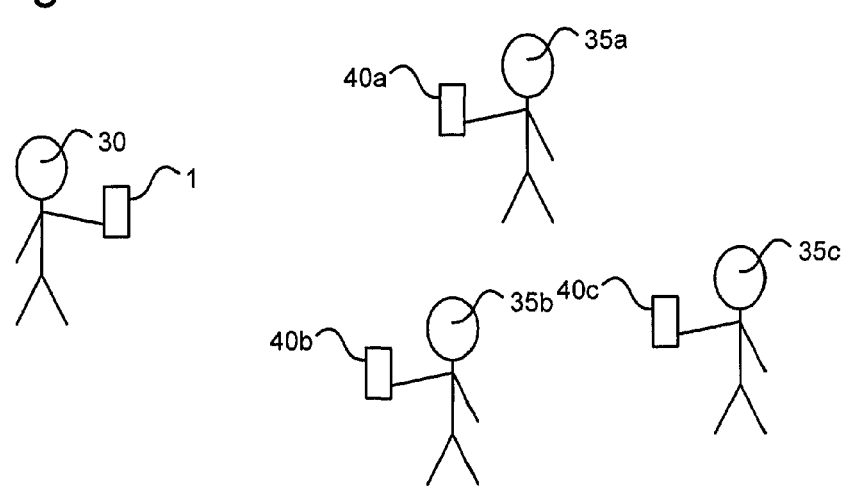
Fig. 3

PORTABLE COMMUNICATION APPARATUS AND METHOD OF CONTROLLING THE SAME

TECHNICAL FIELD

The present invention relates to a portable communication apparatus and to a method of controlling the portable communication apparatus.

BACKGROUND

Portable communication apparatuses, such as mobile phones and smartphones, have gained an increased popularity over the last years, and their popularity continues to increase. Furthermore, such portable communication apparatuses are developed with an increasing level of functionality. For example, in addition to voice-call functionality, present portable communication apparatuses are normally provided e.g. with messaging functionality for sending various types of messages, e.g. email, SMS (Short Message Service), MMS (Multimedia Messaging Service), and chat messages, calendar functionality for keeping track of the user's scheduled events, camera-functionality for taking photos and/or recording video sequences, GPS (Global Positioning System) functionality for tracking a geographical position of the portable communication apparatus, and media-player functionality for playback of media files, such as audio and/or video files.

As a result of the increasing functionality of the portable communication apparatuses, the amount of data in the portable communication apparatuses also tend to increase, e.g. in the form of audio files, video files, image files, messages, calendar entries, etc. Meta data may be added to such data in order to facilitate organizing the data, thereby improving the usability of the portable communication apparatus. For example, date and time may be added as meta data to an image file representing a photo taken with a camera of the portable communication apparatus. In addition, if the portable communication apparatus is provided with GPS functionality, the geographical position where the photo was taken may also be added as meta data. Furthermore, image recognition may be employed to identify persons in the photo, and meta data representing e.g. the names of the persons may be added to the image file. In view of the increasing amount of data present and/or generated in portable communication apparatuses, there is a need for further facilitating organization of the data to further improve the usability of the portable communication apparatuses.

SUMMARY

According to a first aspect, there is provided a method of controlling a portable communication apparatus. The method comprises, in response to a triggering event, detecting electronic devices within a detection range of the portable communication apparatus and, for each detected electronic device, performing a look-up operation in a database of electronic devices and users thereof for determining a user of the electronic device.

The method may further comprise, for each detected electronic device for which the user could be determined from the database, generating meta data identifying the user. In addition, the method may comprise saving said meta data together with data associated with the triggering event.

The portable communication apparatus may comprise a radio communication interface for operation in a wireless communication technology. The detection range of the portable communication apparatus may be a reception range of the radio communication interface, and detecting electronic devices within the detection range of the portable communication apparatus may comprise detecting electronic devices operating in the wireless communication technology within the reception range of the portable communication apparatus. Detecting electronic devices within the detection range of the portable communication apparatus may comprise, for each electronic device, detecting an identifier of the electronic device that uniquely identifies the electronic device in the wireless communication technology. The identifier may e.g. be a Media Access Control (MAC) address, a Bluetooth Device Address, a Universal Subscriber Identity Module (USIM) number, an International Mobile Subscriber Identity (IMSI), or an International Mobile Equipment Identity (IMEI).

Electronic devices to be detected may have reported their geographical position to a location-based service provider. The detection range may be a predetermined or user configurable geographical distance. Detecting electronic devices within a detection range of the portable communication apparatus may comprise detecting a geographical position of the portable communication apparatus and, for each electronic device that has reported a position that is within said geographical distance from the portable communication apparatus, obtaining, from the location-based service provider, a unique identifier of the electronic device and/or a unique identifier of a user of the electronic device.

The portable communication apparatus may comprise a camera and the triggering event may be operation of the camera for taking a still image or recording a video sequence. Saving said meta data together with data associated with the triggering event may comprise saving the meta data in an image file representing the still image or a video file representing the video sequence, or in a sidecar file or database associated with the image file or video file.

The portable communication apparatus may be provided with a calendar function for storing calendar items, each indicating an event and a time at which the event is to take place. The triggering event may be occurrence of the time at which an event of an associated calendar item is to take place. Saving said meta data together with data associated with the triggering event may comprise adding the identified users of the identified electronic devices to a participant list of the calendar item.

The portable communication apparatus may be provided with functionality for playback of media files. The triggering event may be playback of a media file. Saving said meta data together with data associated with the triggering event may comprise saving the meta data in the media file or in a sidecar file or database associated with the media file.

The method may further comprise, for an identified user of an identified electronic device, saving an identifier of the triggering event in a contact entry, corresponding to said user, of a contact list of the portable communication apparatus. Said identifier of the triggering event may e.g. be a link to data associated with the triggering event.

Furthermore, the method may comprise, for each detected electronic device for which the user could not be determined from the database, saving an identifier of the electronic device for enabling automatic or manual identification of the user of the electronic device and addition of an entry in the database associating said user with said electronic device.

According to a second aspect, there is provided a portable communication apparatus adapted to perform the method according to the first aspect. The portable communication apparatus may e.g. be a mobile phone.

According to a third aspect, there is provided a computer program product comprising computer program code means for executing the method according to the first aspect when said computer program code means are run by a programmable control unit of the portable communication apparatus.

According to a fourth aspect, there is provided a computer readable medium having stored thereon a computer program product comprising computer program code means for executing the method according to the first aspect when said computer program code means are run by a programmable control unit of the portable communication apparatus.

Further embodiments of the invention are defined in the dependent claims.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which:

FIG. 1 is a view of a portable communication apparatus according to an embodiment of the present invention;

FIG. 2 is a block diagram of a portable communication apparatus according to an embodiment of the present invention;

FIG. 3 schematically illustrates an example environment where embodiments of the present invention may be utilized;

DETAILED DESCRIPTION

Figure 4:
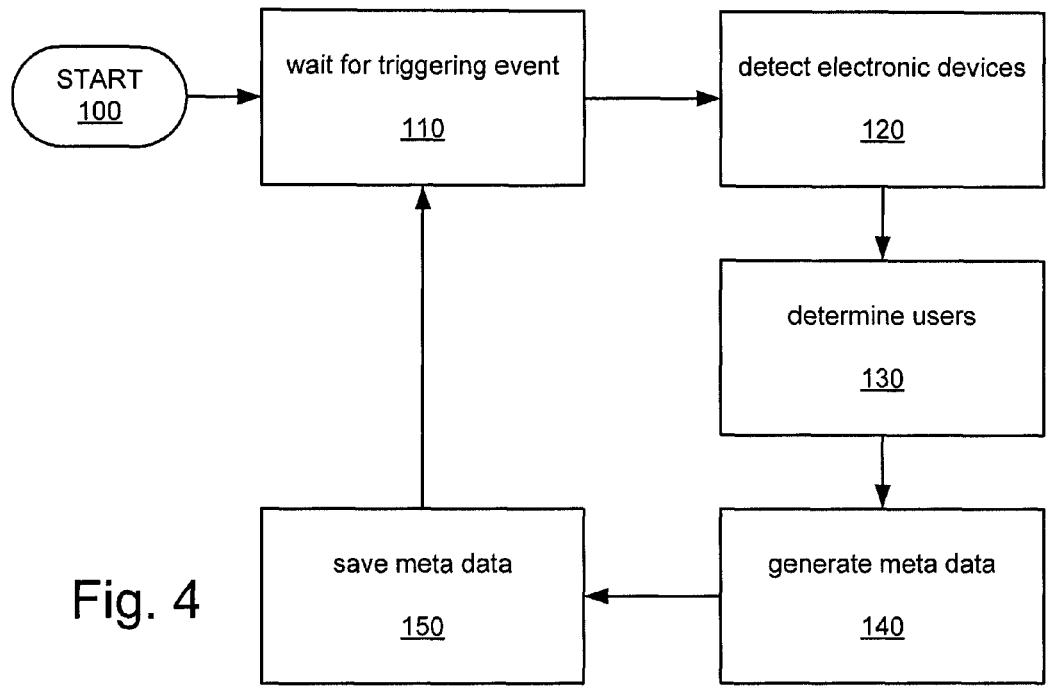
FIG. 4-5 are flowcharts illustrating methods of controlling a portable communication apparatus according to embodiments of the present invention.

FIG. 1 is a view of a portable communication apparatus 1 according to an embodiment of the present invention. The portable communication apparatus 1 may e.g. be a mobile phone. The portable communication apparatus 1 may include one or more input and/or output devices, in the following collectively referred to as I/O devices. As illustrated in FIG. 1, such I/O devices may include, but is not limited to, one or more displays 2 for visualization of text and/or images, one or more speakers 3-5 for audio output, one or more microphones 6 for audio input, one or more physical keys, or buttons, 6-9 for user interaction and/or one or more cameras 10 for taking a still images (or photos) or recording video sequences. The display 2 may be a touch screen that enables user interaction as is known in the art.

FIG. 2 is a block diagram of the portable communication apparatus 1 according to an embodiment of the present invention. According to the embodiment, the portable communication apparatus 1 comprises a control unit 12. Furthermore, the communication apparatus 1 comprises memory 14 for storing data. The block 14 may include non-volatile memory, such as flash memory and the like, volatile memory, such as random access memory (RAM), or a combination thereof. Furthermore, the portable communication apparatus comprises one or more radio communication interfaces 16 for providing radio communication in accordance with various wireless communication technologies. Non-limiting examples of such wireless communication technologies include cellular communication technologies such as GSM (Global System for Mobile Communication) and UMTS (Universal Mobile Telecommunications System), WLAN (Wireless Local-Area Network) technology in accordance with various IEEE 802.11 standards, and short-range wireless communication technologies such as Bluetooth. Such a radio communication interface 16 may e.g. comprise one or more antennas, power amplifiers, low-noise amplifiers (LNAs), mixers, data converters, baseband circuits, and/or other circuitry needed for providing the desired radio communication. The design of such radio communication interfaces is well known in the art and is therefore not further described herein. Various I/O devices, such as the devices 2-10, are collectively represented with a block 20 in FIG. 2. The control unit 12 is operatively connected to the memory 14, the radio communication interface 16, and the I/O devices 20 for controlling and/or exchanging data with these units of the portable communication apparatus 1.

Data in the portable communication apparatus 1 may be generated due to and/or be associated with various events. Such events are in the following referred to as triggering events, and the data generated due to and/or associated with the triggering event is referred to as the data corresponding to the triggering event. Examples of triggering events may include, but are not limited to, taking a still image or recording a video sequence with the camera 3, wherein the corresponding data may be a resulting image file or video file;

occurrence of the time at which an event of an associated calendar item of a calendar function of the portable communication apparatus is to take place, wherein the corresponding data may be the calendar item; and/or playback of a media file, such as an audio or video file, on the portable communication apparatus 1, wherein the corresponding data may be the media file.

The inventor has realized that the usability of the portable communication apparatus 1 can be improved by tagging the corresponding data with further meta data regarding other persons (i.e. other than the user of the portable communication apparatus 1) involved in the triggering event. Thereby, an improved organization of the data may be obtained. For some types of data, meta data indicating involved persons may already exist to some extent. However, such meta data may be incomplete and insufficient. For example, persons participating in an event of a calendar item, such as a lunch or a business meeting, may be indicated in a participant list of the calendar item, which e.g. may have been generated when setting up the meeting. However, it is not certain that this participant list corresponds to the persons that actually attended the event. Some persons on the list may have been missing, and further persons, not on the list, may have joined the event, when it actually took place. Furthermore, image recognition may be employed to identify persons in a photo, and meta data representing e.g. the names of the persons may be added to the resulting image file. However, only persons actually in the photo may be identified, but not persons that are present at the occasion when the photo is taken but not present in the actual photo. Furthermore, in some instances, the image recognition may fail in correctly identifying one or more of the persons in the photo.

To provide the improved usability in a practical way, it is desirable to efficiently generate the meta data. For example, it is desirable to avoid, as much as possible, that the user would have to enter such meta data manually into the portable communication apparatus 1. Therefore, in accordance with embodiments of the present invention, there is provided a method of controlling the portable communication apparatus 1. The method may e.g. be performed by the control unit 12.

FIG. 3 schematically illustrates an example environment where embodiments of the present invention may be utilized. The portable communication apparatus 1 and its user 30 is present at a certain geographical location. The location may be the location of a certain occasion, such as a party, a lunch, or a business meeting. Nearby, other persons 35a-c involved in the occasion and carrying electronic devices 40a-c are also present. The presence of the electronic devices 40a-c is detectable by the portable communication apparatus 1. Such an electronic device 40a-c may e.g. be another portable communication apparatus (e.g. mobile phone), but may also be some other kind of electronic device that is detectable by the portable communication apparatus 1. For example, the electronic device 40a-c may be an accessory of a portable communication apparatus, such as a wireless headset (e.g. Bluetooth headset).

FIG. 4 is a block diagram of an embodiment of the method. According to this embodiment, the operation of the method is started in step 100. In step 110, the method is stalled waiting for a triggering event. In response to the occurrence of a triggering event, the operation proceeds to step 120. In step 120, electronic devices 40a-c within a detection range of the portable communication apparatus 1 are detected. In step 130, users 35a-c of the electronic devices 40a-c are determined. The portable communication apparatus may be provided with a database of electronic devices and users thereof. For example, the portable communication apparatus 1 may be provided with a contact list, or an address book. Each contact entry of the contact list correspond to a particular person, or "contact", and may specify various data related to the person, such as name, address(es), phone number(s), email address (es), etc, as is known in the art. In addition, electronic devices belonging to that person may be identified in the contact entry, e.g. in the form of a MAC (Media Access Control) address, Bluetooth Device address, a USIM (Universal Subscriber Identity Module) number or an IMSI (International Mobile Subscriber Identity) associated with a subscriber module such as a SIM (Subscriber Identity Module) card or the like inserted into the electronic device, an International Mobile Equipment Identity (IMEI), or other identifier that uniquely identifies the electronic device. Alternatively, such a database may be external to the portable communication apparatus 1. For example, the database may be stored on a server accessible over a wide-area network (WAN) such as the internet. Step 130 comprises, for each detected electronic device 40a-c, performing a look-up operation in said database of electronic devices and users thereof for determining a user 35a-c of the electronic device 40a-c. In step 140, meta data identifying the user 35a-c is generated for each detected electronic device 40a-c for which the user 35a-c could be determined from the database in step 130. Furthermore, in step 150, the meta data generated in step 140 is saved together with data associated with the triggering event.

According to some embodiments, one of the radio communication interfaces 16, such as a Bluetooth or WLAN interface, of the portable communication apparatus 1 is utilized for detecting electronic devices 40a-c in step 120. The detection range may in that case be a reception range of the radio communication interface 16. Detecting electronic devices 40a-c within the detection range of the portable communication apparatus 1 may comprise detecting electronic devices 40a-c operating in the corresponding wireless communication technology (e.g. Bluetooth or WLAN) within the reception range of the portable communication apparatus 1. Detecting electronic devices 40a-c may e.g. be accomplished by, for each electronic device, detecting an identifier of the electronic device that uniquely identifies the electronic device in the wireless communication technology, such as but not limited to a MAC address or a Bluetooth Device Address.

Figure 5:
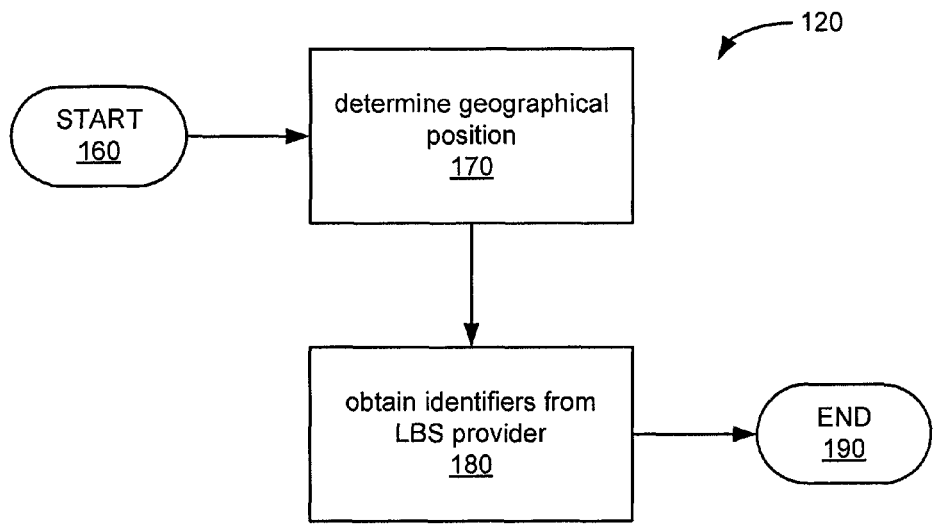

According to alternative embodiments, some electronic devices 40a-c may be capable of determining their geographical position, e.g. using a GPS (Global Positioning System) receiver of the electronic device 40a-c. Furthermore, these electronic devices may be adapted to report their geographical position to a location-based service (LBS) provider, e.g. over a wide-area network (WAN) such as the internet. For example, the LBS provider may have one or more servers for that purpose. In this case, the detection range of the portable communication apparatus 1 may be a geographical distance, such as a predetermined geographical distance or a user configurable geographical distance. Step 120 of detecting electronic devices may comprise detecting a geographical position of the portable communication apparatus 1. For example, the portable communication apparatus 1 may comprise a GPS receiver for that purpose. Furthermore, step 120 may comprise obtaining, from the LBS provider (e.g. over a WAN such as the internet), a unique identifier of each electronic device 40a-c that has reported a position that is within said geographical distance from the portable communication apparatus 1. The identifier may e.g. be obtained from said one or more servers of the LBS provider. The identifier may e.g. be a MAC address, a Bluetooth Device Address, a USIM, an IMSI, an IMEI, a phone number, or some other address or serial number that uniquely identifies the electronic device 40a-c. Alternatively or additionally, a unique identifier of the user of the electronic device 40a-c, or "user ID", registered with the LBS provider may be obtained from the LBS provider. An embodiment utilizing an LBS provider is illustrated in FIG. 5, which shows a flow chart for an embodiment of step 120 (FIG. 4). The operation of step 120 is started in step 160. In step 170, the geographical position of the portable communication apparatus is determined. Thereafter, the identifiers of the electronic devices 40a-c that have reported a position that is within said geographical distance from the portable communication apparatus 1 are obtained from the LBS provider in step 180. Subsequently, the operation of step 120 is ended in step 190.

The above-described alternatives for detecting electronic devices 40a-c may be combined in some embodiments. For example, some electronic devices 40a-c may be detected via the radio communication interface 16, whereas other electronic devices 40a-c may be detected via an LBS provider.

According to some embodiments, as indicated above, the portable communication apparatus 1 comprises a camera 10. In that case, a triggering event may be operation of the camera 10 for taking a still image or recording a video sequence. For this example, step 150 may comprise saving the meta data in an image file representing the still image or a video file representing the video sequence. Alternatively or additionally, step 150 may comprise saving the meta data in a sidecar file or database associated with the image file or video file.

Furthermore, according to some embodiments, as indicated above, the portable communication apparatus 1 may be provided with a calendar function for storing calendar items, each indicating an event and a time at which the event is to take place. In that case, a triggering event may be the occurrence of the time at which an event of an associated calendar item is to take place. For this example, step 150 may e.g. comprise adding the identified users 35a-c of the identified electronic devices 40a-c to a participant list of the calendar item.

Moreover, according to some embodiments, the portable communication apparatus 1 may be provided with functionality for playback of media files, such as audio and/or video files. In that case, a triggering event may be playback of such a media file. For this example, step 150 may comprise saving the meta data in the media file. Alternatively or additionally, step 150 may comprise saving the meta data in a sidecar file or database associated with the media file. In addition, meta data indicating the time and/or place when the playback occurred may be added to the meta data.

Figure 6:
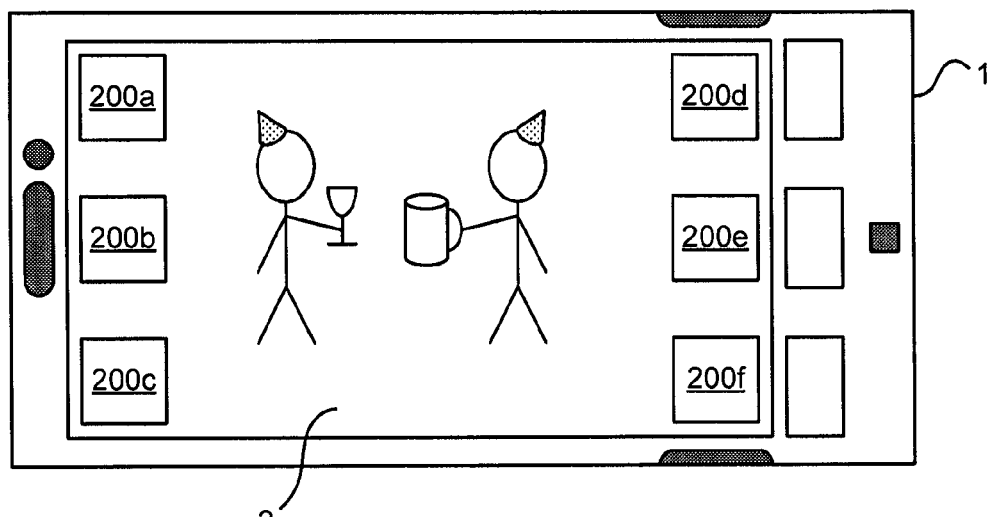
FIG. 6 illustrates a portable communication apparatus according to an embodiment of the present invention displaying a photo on a display of the portable communication apparatus.

FIG. 6 illustrates how the added meta data may improve the usability of the portable communication apparatus 1. When data associated with an earlier occurred triggering event is accessed, in FIG. 6 illustrated with display of a still image taken with the camera 10, the user 30 may be presented with a number of menu items 200a-f, or other user interface items, each associated with another person that participated at the triggering event as identified by the meta data. Through such a menu item 200a-f, the user 30 may perform various tasks related to the associated person, such as calling the person, sending a message (e.g. SMS, MMS, or email) to the person, or accessing the persons contact entry in the contact list of the portable communication apparatus 1. For example, when accessing a menu item 200a-f, the user 30 may be presented with a sub menu for choosing such a task related to the associated person.

Figure 7:
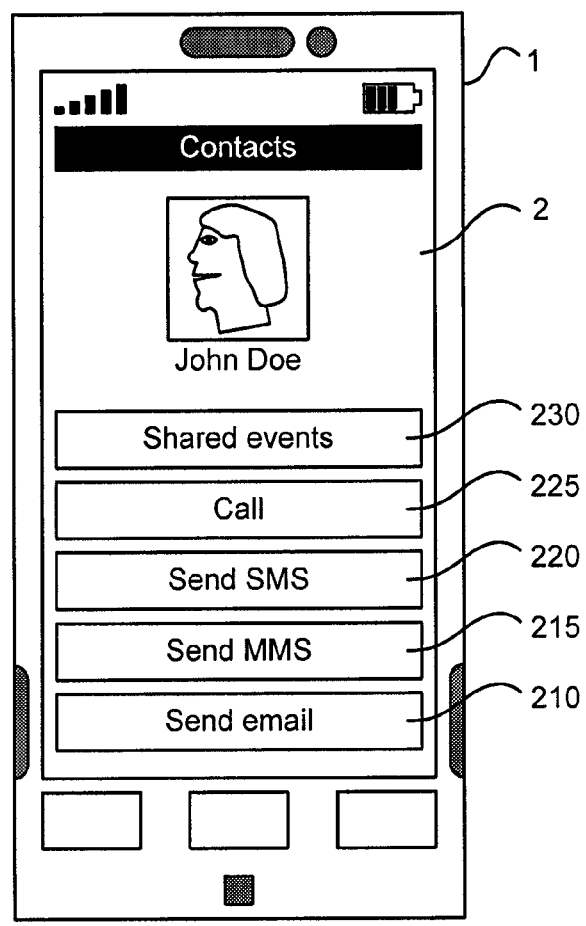
FIG. 7 illustrates a portable communication apparatus according to an embodiment of the present invention displaying a contact entry on a display of the portable communication apparatus.

According to some embodiments, the method may further comprise, for one or more identified users of identified electronic devices, saving an identifier of the triggering event in the contact entries corresponding to said users in the contact list of the portable communication apparatus 1. For example, the identifier may be a link to said data associated with the triggering event. FIG. 7 illustrates the usefulness of such embodiments. A contact entry of a person ("John Doe") is displayed on the display 2 of the portable communication apparatus 1. The user 30 is presented with a number of menu items 210 corresponding to a number of tasks that may be performed in relation to that person, e.g. sending an email (210), sending an MMS message (215), sending an SMS message (220), or placing a call (225) to that person. In addition, the user 30 is presented with a menu item 230 for accessing events shared with the person. For example, when accessing the menu item 230, the user may be able to access links to data associated with triggering events for which it has been identified that said person has participated.

The portable communication apparatus 1 may in some embodiments be capable of automatic or semi-automatic updating the database of electronic devices and users thereof. For example, the above-described method may in some embodiments comprise, for each detected electronic device for which the user could not be determined from the database in step 130, saving an identifier of the electronic device for enabling automatic or manual identification of the user of the electronic device and addition of an entry in the database associating said user with said electronic device. For example, the user 30 of the portable communication apparatus 1 may be presented, e.g. on the display 2, with query from the portable communication apparatus 1 to manually input the identity of the user of the electronic device in question for which the user could not be identified from the data base. Alternatively, the user 30 may be presented with an option to send a message to the electronic device in question asking the user of that electronic device to identify himself. Further alternatively, portable communication apparatus 1 may perform a statistical analysis to attempt to automatically determine the user of the electronic device in question. For example, for each triggering event for which the presence of electronic device in question is detected, the portable communication apparatus 1 may be adapted to gather statistical data regarding persons that have been identified as participants at the triggering event by other means. For example, such persons may e.g. have been identified by means of other electronic devices that are listed in the database, or by means of image recognition on a photo taken with the camera 10 of the portable communication apparatus 1. If a person is known to be present more than a certain threshold percentage of the number of triggering events for which the presence of electronic device in question is detected, the portable communication apparatus 1 may be adapted to automatically associate the electronic device in question with said person in the database. Alternatively, the portable communication apparatus 1 may be adapted to prompt the user 30 for verification before associating the electronic device in question with said person. Such verification may e.g. be needed if more than one person is known to be present more than said threshold percentage of the number of triggering events for which the presence of electronic device in question is detected.

According to some embodiments of the present invention, identification of electronic devices and users thereof, as described above, may be utilized without necessarily generating and/or saving any meta data related thereto. For example, the triggering event may be execution or activation of a media player functionality of the portable communication apparatus 1. In response to determining which other persons are present in accordance with the embodiments described above, the portable communication apparatus 1 may suggest a playlist of songs (or other media content) for playback using the media player functionality, e.g. based on songs that have been played at earlier triggering events when one or more of these persons have been present. For example, the songs on the suggested playlist may be selected as a random selection of the songs that have been played at said earlier triggering events. Alternatively, the songs on the suggested play list may be selected (e.g. randomly) from songs related to the songs that have been played at said earlier triggering events, such as songs by the same artists, songs in the same category (e.g. rock, pop, soul, hip-hop, . . . ), songs by the same composer, and/or the like.

According to some embodiments of the present invention, the portable communication apparatus 1 is adapted to perform the method described above with reference to various embodiments.

Figure 8:
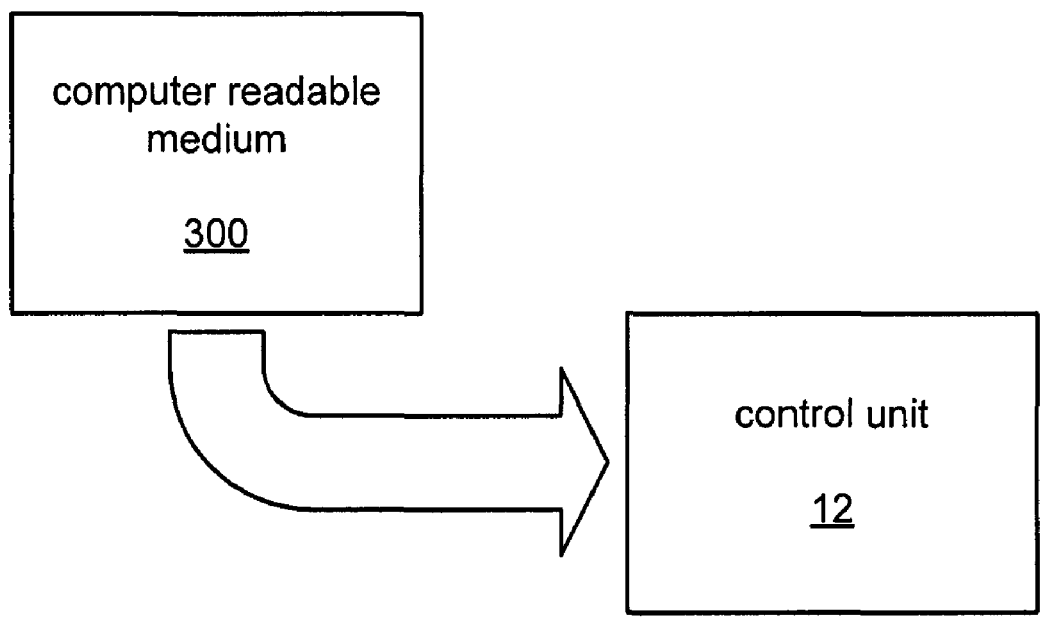
FIG. 8 schematically illustrates a computer-readable medium and a control unit according to an embodiment of the present invention.

The control unit 12 (FIG. 2) may be implemented as an application-specific hardware unit. Alternatively, the control unit 12 or parts thereof may be implemented using one or more configurable or programmable hardware units, such as but not limited to one or more field-programmable gate arrays (FPGAs), processors, or microcontrollers. Thus, the control unit 12 may be a programmable control unit. Hence, embodiments of the present invention may be embedded in a computer program product, which enables implementation of the method and functions described herein, e.g. the embodiments of the method described above. Therefore, according to embodiments of the present invention, there is provided a computer program product, comprising instructions arranged to cause the programmable control unit 12 to perform the steps of any of the embodiments of the method described above. The computer program product may comprise program code which is stored on a computer readable medium 300, as illustrated in FIG. 8, which can be loaded and executed by the programmable control unit 12, to cause it to perform the steps of any of the embodiments of the method described above.

The present invention has been described above with reference to specific embodiments. However, other embodiments than the above described are possible within the scope of the invention. Different method steps than those described above, performing the method by hardware or software, may be provided within the scope of the invention. The different features and steps of the embodiments may be combined in other combinations than those described. The scope of the invention is only limited by the appended patent claims.

The invention claimed is:

1. A method of controlling a portable communication apparatus, comprising, in response to a triggering event,
- detecting electronic devices within a detection range of the portable communication apparatus;
- for each detected electronic device, performing a look-up operation in a database of electronic devices and users thereof for determining a user of the electronic device; and
- identifying in a contact list a contact entry which is associated with at least one of the detected electronic devices, and saving an identifier of the triggering event in the identified contact entry of the contact list;
- wherein electronic devices to be detected have reported their geographical position to a location-based service provider, the detection range is a predetermined or user configurable geographical distance, and detecting electronic devices within a detection range of the portable communication apparatus comprises:
- detecting a geographical position of the portable communication apparatus; and
- for each electronic device that has reported a position that is within said geographical distance from the portable communication apparatus, obtaining, from the location-based service provider, a unique identifier of the electronic device and/or a unique identifier of a user of the electronic device.

2. The method according to claim 1, further comprising:
for each detected electronic device for which the user could be determined from the database, generating meta data identifying the user.

3. The method according to claim 2, further comprising saving said meta data together with data associated with the triggering event.

4. The method according to claim 1, wherein the portable communication apparatus comprises a radio communication interface for operation in a wireless communication technology, said detection range of the portable communication apparatus is a reception range of the radio communication interface, and detecting electronic devices within the detection range of the portable communication apparatus comprises detecting electronic devices operating in the wireless communication technology within the reception range of the portable communication apparatus.

5. The method according to claim 4, wherein detecting electronic devices within the detection range of the portable communication apparatus comprises, for each electronic device, detecting an identifier of the electronic device that uniquely identifies the electronic device in the wireless communication technology.

6. The method according to claim 5, wherein the identifier is a Media Access Control, MAC, address, a Bluetooth Device Address, a Universal Subscriber Identity Module, USIM, number, an International Mobile Subscriber Identity, IMSI, or an International Mobile Equipment Identity, IMEI.

7. The method according to claim 1, wherein the portable communication apparatus comprises a camera and the triggering event is operation of the camera for taking a still image or recording a video sequence.

8. The method according to claim 3, wherein the portable communication apparatus comprises a camera, the triggering event is operation of the camera for taking a still image or recording a video sequence, and saving said meta data together with data associated with the triggering event comprises saving the meta data in an image file representing the still image or a video file representing the video sequence, or in a sidecar file or database associated with the image file or video file.

9. The method according to claim 1, wherein the portable communication apparatus is provided with a calendar function for storing calendar items, each indicating an event and a time at which the event is to take place, and the triggering event is occurrence of the time at which an event of an associated calendar item is to take place.

10. The method according to claim 3, wherein the portable communication apparatus is provided with a calendar function for storing calendar items, each indicating an event and a time at which the event is to take place, the triggering event is occurrence of the time at which an event of an associated calendar item is to take place, and saving said meta data together with data associated with the triggering event comprises adding the identified users of the identified electronic devices to a participant list of the calendar item.

11. The method according to claim 1, wherein the portable communication apparatus is provided with functionality for playback of media files and the triggering event is playback of a media file.

12. The method according to claim 3, wherein the portable communication apparatus is provided with functionality for playback of media files, the triggering event is playback of a media file, and saving said meta data together with data associated with the triggering event comprises saving the meta data in the media file or in a sidecar file or database associated with the media file.

13. The method according to claim 1, wherein said identifier of the triggering event comprises a link to data associated with the triggering event.

14. The method according to claim 1, further comprising, for each detected electronic device for which the user could not be determined from the database, saving an identifier of the electronic device for enabling automatic or manual identification of the user of the electronic device and addition of an entry in the database associating said user with said electronic device.

15. A portable communication apparatus comprising:
- an interface operative to receive information to detect electronic devices within a detection range of the portable communication apparatus, wherein electronic devices to be detected have reported their geographical position to a location-based service provider, the detection range is a predetermined or user configurable geographical distance; and
- a control unit operative
  - to perform, for each detected electronic device, a look-up operation in a database of electronic devices and users thereof for determining a user of the electronic device;

to identify in a contact list a contact entry which is associated with at least one of the detected electronic devices;
to cause an identifier of the triggering event to be stored in the identified contact entry of the contact list;
to detect a geographical position of the portable communication apparatus; and for each electronic device that has reported a position that is within said geographical distance from the portable communication apparatus,
to obtain, from the location-based service provider, a unique identifier of the electronic device and/or a unique identifier of a user of the electronic device.

16. The portable communication apparatus according to claim 15, wherein the portable communication apparatus is a mobile phone.

17. A computer program product embodied on a non-transitory computer readable storage medium comprising computer program code means executable instructions for executing the method according to claim 1, when said computer program code means executable instructions are run by a programmable control unit of the portable communication apparatus.

18. A non-transitory computer readable storage medium having stored thereon a computer program product comprising computer program code means executable instructions for executing the method according to claim 1, when said computer program code means executable instructions are run by a programmable control unit of the portable communication apparatus.

* * * * *